United States Patent [19]

Stadler

[11] Patent Number: 5,064,050
[45] Date of Patent: Nov. 12, 1991

[54] METER ASSEMBLY FOR ACCUMULATING CONVEYORS

[75] Inventor: Jeffery A. Stadler, Fenton, Mich.

[73] Assignee: Excel Corporation, Fenton, Mich.

[21] Appl. No.: 660,726

[22] Filed: Feb. 25, 1991

[51] Int. Cl.⁵ ............................................. B65G 47/26
[52] U.S. Cl. .............................. 198/459; 198/463.4; 221/301; 221/223
[58] Field of Search ................ 198/459, 463.4, 463.6; 221/289, 290, 297, 299, 301, 223

[56] References Cited

U.S. PATENT DOCUMENTS

| | | | |
|---|---|---|---|
| 2,943,724 | 7/1960 | McCoy | 198/459 |
| 2,989,167 | 6/1961 | Mattingly et al. | 198/459 |
| 3,327,835 | 6/1967 | Wunsche | 198/459 X |
| 3,333,733 | 8/1967 | Clark et al. | 221/301 |
| 3,462,823 | 8/1969 | Heisler | 198/459 X |
| 4,526,097 | 7/1985 | Cound | 221/301 X |

FOREIGN PATENT DOCUMENTS

| | | | |
|---|---|---|---|
| 2452098 | 5/1976 | Fed. Rep. of Germany | 198/463.4 |
| 0642135 | 1/1979 | U.S.S.R. | 198/463.6 |

*Primary Examiner*—D. Glenn Dayoan
*Attorney, Agent, or Firm*—Gifford, Groh, Sprinkle, Patmore and Anderson

[57] ABSTRACT

A metering assembly for use in conjunction with an accumulating conveyor to separate parts, one at a time, from a row of abutting parts or from a flow of parts to create spacing on a continuation of the conveyor to enhance further operations or to discharge parts directly from the conveyor. A pivoting metering block receives a single part from the accumulating conveyor and advances it forward while retaining the next succeeding part, assuring single part spacing or discharge.

5 Claims, 3 Drawing Sheets

METER ASSEMBLY FOR ACCUMULATING CONVEYORS

BACKGROUND OF THE INVENTION

1. Field of the Invention

This invention relates to accumulating conveyor systems. More particularly, this invention relates a metering mechanism or assembly for separately advancing parts on an accumulating conveyor in order to space the parts out on the conveyor and in some instances to directly discharge the parts from the conveyor.

2. Description of the Prior Art

In an accumulating type conveyor, parts are advanced, usually in a single row, in a step by step manner. The parts accumulate or stack up in abutting relationship at a discharge point or at the end cf the conveyor. In particularly long conveyors, the stacking up of a great number of parts can tend to overload the discharge or other handling mechanism and can cause damage to and jamming of this mechanism. With each step by step movement, the forward thrust of the abutting parts is transmitted to act against the discharge or other orienting mechanism.

A widely accepted type of accumulating conveyor is known as a lift and carry or walking beam conveyor. One such conveyor of an advanced design is described in U.S. Pat. No. 4,838,411. The conveyor of this patent utilizes a pair of elongated, spaced apart and parallel stationary rails. A pair of movable rails are located between the stationary rails and move from a point below to a point above the rails, and from a retracted position to an advanced or forward position. Thus parts resting on the stationary rails are picked up by the movable rails and moved forward to a point where they are again lowered to a resting position on the stationary rails. This type of conveyor is particularly adapted for use in conveying conventional parts which extend above the rails and also elongate parts which extend between the rails. For example, automotive connecting rods can be conveyed with or without a cap attached to the beam while the beam extends between the rails, or the cap can be conveyed alone supported entirely above the rails. In either mode, the accumulation of abutting parts causes considerable force to be exerted against a device at the end of the conveyor which is attempting to discharge the parts one at a time.

Many solutions to this problem of excessive longitudinal force transmission in accumulating conveyors have been advanced and used with varying degrees of success and having varying disadvantages. In longer conveyor systems, the conveyor can be divided into separately operating segments which break up or limit the number of parts which can accumlate at the discharge point. This requires portions of the conveyor to remain idle for periods of time and then be operated to catch up the flow of parts. This in turn, results in a slower overall operating rate.

Other systems may use staking mechanisms which employ a tapered pin which is driven between abutting parts to cause separation. This can involve a considerable degree of complexity in sensing the contacting faces of the parts so that the stake pin passes between parts and does not directly impact a single part. Even with good synchronization, scratching or marring of the parts by this type of separation or discharge mechanism can be unsatisfactory, particularly for many parts such as the above mentioned engine connecting rods.

SUMMARY OF THE INVENTION

The present invention provides a solution to the foregoing force build up problem in the form of a metering device or assembly which spaces parts out on an accumulating conveyor. The metering assembly may itself be used as a discharge mechanism, or more generally it will be used to separate the parts at an intermediate point on the conveyor to limit the part build up or provide spacing in which a robotic arm, tilt and lift or some other type of device may discharge the parts, one at a time.

The metering assembly of the invention uses a pair of opposed metering blocks which are pivotally mounted on substantially vertical axes. Each block has a forward and rear boss for successively engaging a single part from a row of parts on an accumulating conveyor. The metering blocks are pivoted in synchronism from a loading position, in which the accumulating conveyor can advance a part past the rear bosses into contact with the forward bosses, to a discharge position, in which the rear bosses contact the part moving the part passed the forward bosses to an advanced position. At the same time the rear bosses restrain advancement Of the next part on the conveyor. The bosses preferably are in the form of rollers which are free to rotate as they engage the parts.

Various types of motors can be used to pivot the metering blocks, but, prefereably, a fluid motor is used in the form of a pneumatic cylinder. Pivot shafts connect the metering blocks to slotted pivot arms. The piston rod of the fluid cylinder is connected to a cross bar, and the cross bar carries a pair of spaced stud shafts with cam rollers that move in the slots of the pivot arms. As the fluid cylinder is reciprocated moving the cross bar, the cam rollers move in the slots of the pivot arms pivoting the metering blocks through the pivot shafts between the loading position and the advanced position.

In a preferred form of the invention the meter assembly has a frame which includes spaced sides which are mounted on the accumulating conveyor and a top member which spans the vertical sides over the conveyor. The fluid cylinder is mounted on the top member with its piston rod connected to the cross member. The slotted pivot arms are also mounted on the frame top with the rollers on the cross member riding in the pivot arm slots. The pivot shafts extend through the top member to the metering blocks which are free to be rotated between the loading and discharge positions.

In a further preferred form of the invention, the pivot shafts which are journaled in the top frame member have square cross section portions which engage rectangular slots in the pivot arms and metering blocks. These pivot rod portions extend out of the slots in the pivot arms and metering blocks and are engaged by rectangular slots in cap members which are fastened to the pivot arms and metering blocks to rigidly retain the shafts.

BRIEF DESCRIPTION OF THE DRAWING

The preferred embodiment of the invention is illustrated in the drawing in which.

DETAILED DESCRIPTION OF A PREFERRED EMBODIMENT OF THE PRESENT INVENTION

Figure 1:
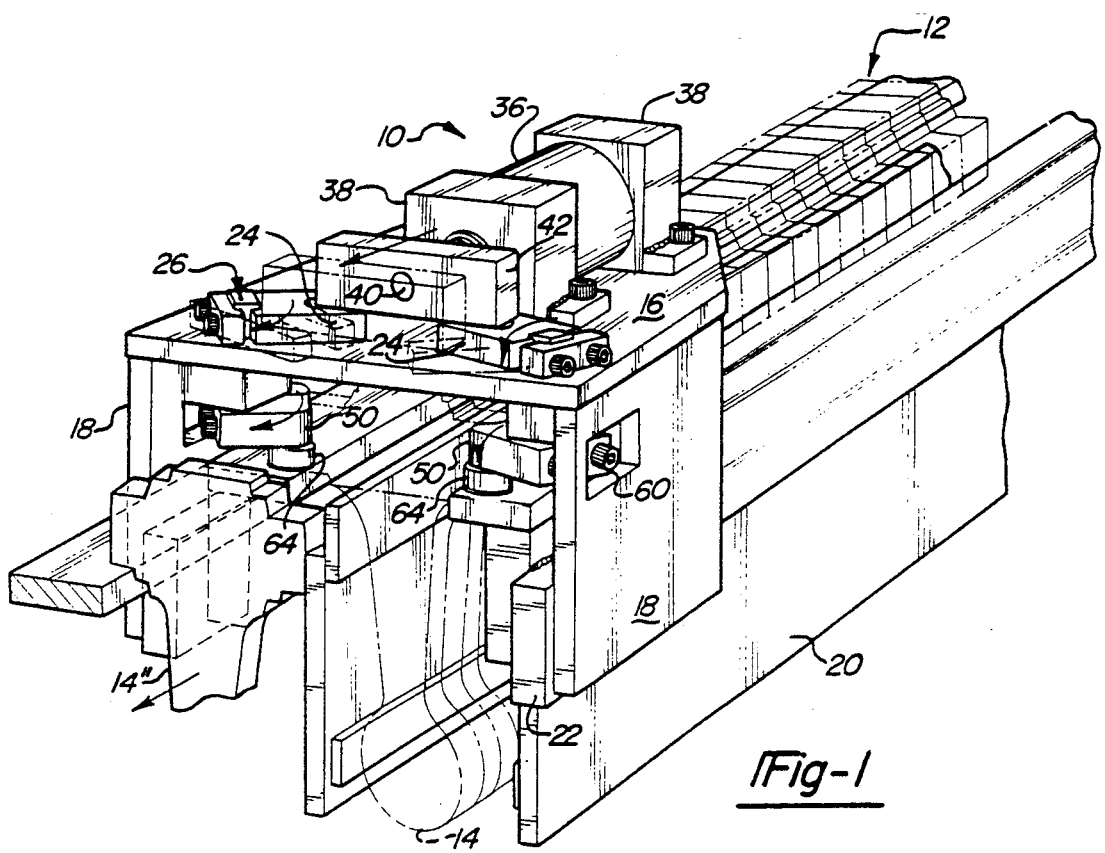
FIG. 1 is a perspective of the meter assembly of this invention attached to an accumulating conveyor showing a part having been separated and advanced on a conveyor from a loading position in which a number of parts, shown in phantom, are on the conveyor in abutting relationship to each other.

With particular reference to FIG. 1, the meter assembly 10 of this invention is shown attached to an accumulating conveyor 12 conveying parts 14 in the form of automotive connecting rods along the conveyor to a position in which one of the connecting rod parts 14" has been separated and advanced along the conveyor from an accumulated row of abutting parts. The meter assembly has a frame including a generally horizontally disposed top plate 16 and generally vertically disposed spaced side plates 18. The side plates 18 are connected to stationary members 20 of the accumulating conveyor 12 with spacer bars 22.

A pair of pivot arms 24 are pivotally mounted to top plate 16 by pivot shafts 26 journaled in the top plate 16. Pivot shafts 26 are retained in the pivot arms 24 by the coaction of a square cross section portion 28 of the pivot shaft 26 with a rectangular mounting slot 30 in the pivot arm 24 and a cap member 32 having a rectangular slot 33 for engaging a protruding portion of the pivot shaft square cross section 28 as the cap 32 is tightened to the pivot arm 24 by machine screws 34. A pivoting motor in the form of a pneumatic cylinder 36 is mounted to the top plate 16 by mounting blocks 38 with its piston rod 40 extending between the pivot arms 24 Carrying a cross bar 42 extending above the pivot arms 24. The cross bar carries a pair of depending stud shafts 44 carrying cam rollers 46 which engage cam slots 48 in the pivot arms 24.

Figure 3:
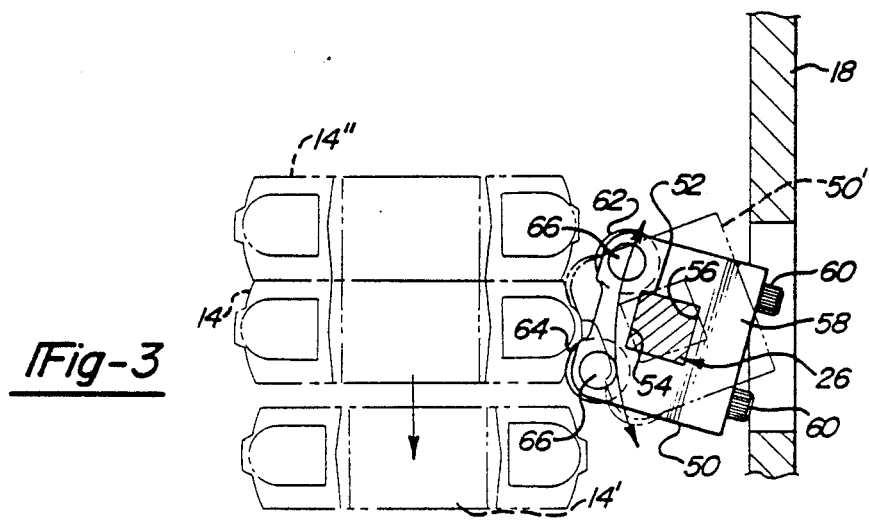
FIG. 3 is a cross sectional view taken along line 3—3 in FIG. 2 showing one of the metering blocks of the invention and its movement relative to parts on the accumulating conveyor.
Figure 2:
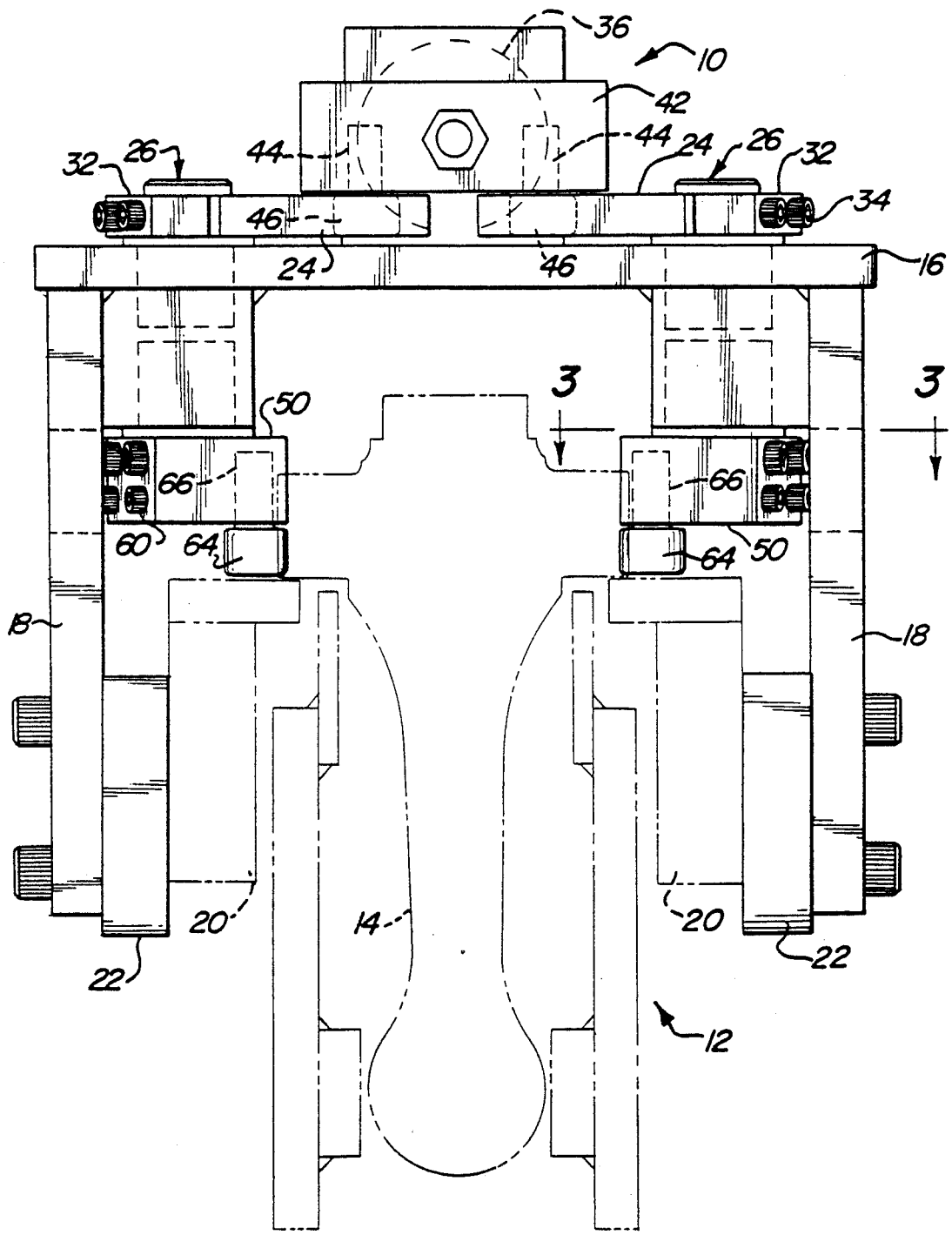
FIG. 2 is a front elevational view of the metering assembly showing one of the parts being separated resting on the fixed beams of the walking beam or lift and carry conveyor.

Referring to FIGS. 1-3 and particularly to FIG. 3, metering blocks 50 are connected to each of the pivot shafts 26 at a square cross section portion 52 of the pivot shaft in the same manner as the shaft is connected to the pivot arms 24. That is, square shaft portion 52 is engaged in rectangular metering block slot 54 and in a rectangular slot 56 in cap member 58, and the cap is tightened to the metering block 50 by machine screws 60. Each of the metering blocks 50 are supplied with a rear and forward part engaging boss in the form of a rear roller 62 and a forward roller 64 attached to stud shafts 66.

Figure 4:
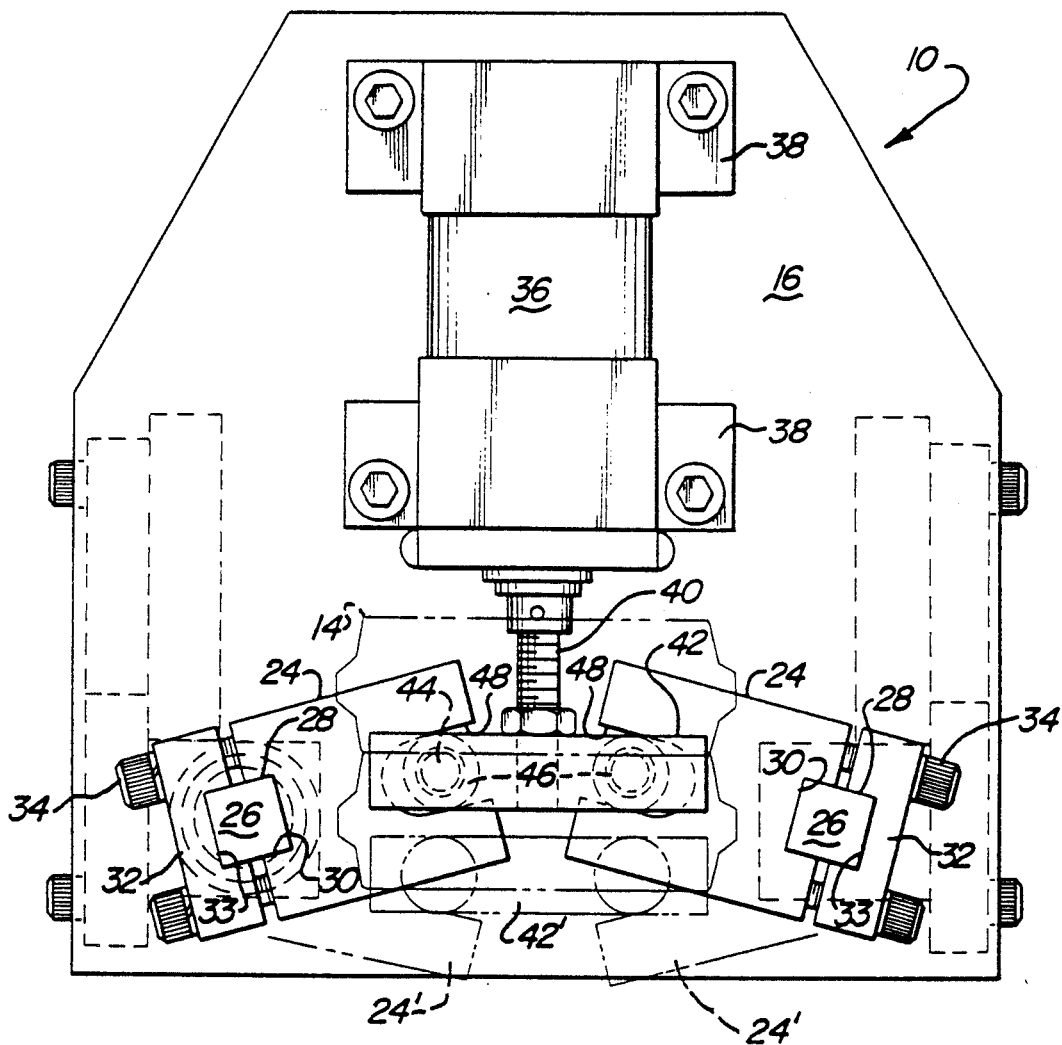
FIG. 4 is a plan view of the metering assembly showing the pivot arms as they are oriented when the metering blocks are in the loading position of the assembly, and showing in phantom the orientation of the pivot arms when the metering blocks are in the discharge position of the assembly.

Referring to FIGS. 1,3 and 4, as the cylinder 36 is reciprocated from a retracted position, shown by the cross bar 42 in full line in FIG. 4, to its extended position, shown by the position of cross bar 42' in phantom, the pivot arms 24 are rotated from their full line position in FIG. 4 to their phantom position 24' by the movement of cam rollers 46 in cam slots 48. This in turn rotates metering blocks 50 through pivot shafts 26 from a loading position shown in full line to a discharge position shown by the phantom line positon of metering blocks 50' in FIG. 3. In the loading position, a part 14 is advanced by the conveyor 12 past the rear rollers 62 of the metering blocks into contact with the forward rollers 64. When the cylinder 36 is extended in the direction of the arrow in FIG. 1, the pivot arms and metering blocks rotate in the direction of the arrows in FIG. 1 moving the metering blocks to the phantom position 50' in FIG. 3, allowing the rear rollers 62 to push the part 14 forward past the forward rollers 64 to the spaced apart position of the part 14'. At the same time, the rear rollers 62 prevent the next part 14" from advancing.

It can be seen from the foregoing description of the presently known preferred embodiment of the invention that the metering assembly separates parts one at a time from a row of abutting parts to space them out on a continuing conveyor or to discharge them one at a time to another location. When the metering assembly is used as a discharge device, the variety of associated equipment or the modes of discharge is virtually unlimited since the parts are being handled one at a time. For example, the discharge can be by gravity directly from the metering blocks, the parts may be conveyed by the metering blocks to a nesting pallet or tray, the parts can be delivered to a horizontal conveyor and reoriented during the transfer, etc.

It will be appreciated that the spacing or discharge rate can be easily controlled by well known means. For example with the use of fluid motors such as the pneumatic cylinder illustrated, a solenoid operated pilot valve can be used which is actuated through a control circuit from proximity switches, timing devices or other upstream or downstream condition sensors or by preprogrammed routines.

The embodiments of the invention in which an exclusive property or privilege is claimed are defined as follows:

1. A meter assembly for separately advancing parts one at a time on an accumulating conveyor comprising:
    a pair of opposed metering blocks pivotally mounted on substantially vertical axes;
    each metering block having a forward and a rear boss for successively engaging a single part from a row of parts on an accumulating conveyor; and
    pivot means for pivotally moving said metering blocks in synchronism from a loading position, in which said accumulating conveyor can advance a part past said rear bosses into contact with said forward bosses, to a discharge position, in which said rear bosses contact said part moving said part past said forward bosses to an advanced position, said rear bosses restraining advancement of the next part on said conveyor.

2. The meter assembly according to claim 1 wherein said forward and rear bosses are rollers which engage said parts.

3. The meter assembly according to claim 1 wherein said pivot means includes a shaft located along each of said vertical axes connecting said metering blocks to slotted pivot arms; a fluid cylinder having its piston rod connected to a cross bar; said cross bar having a pair spaced stud shafts with cam rollers moving in the slots of said pivot arms;
    whereby as said fluid cylinder is reciprocated, reciprocating said cross bar, the cam rollers move in the slots of said pivot arms pivoting said metering blocks through said shafts between said loading position and said advanced position.

4. A meter assembly for separately advancing parts one at a time on an accumulating conveyor, comprising:
 a frame including spaced vertical side members for mounting on an accumulating conveyor and a top member spanning said side members;
 a fluid cylinder mounted on said top member with its piston rod connected to a cross member;
 a pair of slotted pivot arms mounted on said top member for pivotal movement;
 said cross member carrying a pair of spaced stud shafts with cam rollers movable in the slots of said pivot arms;
 a pair of pivot shafts, one connected to each of said pivot arms and extending through said top member;
 a pair of metering blocks connected to said pivot shafts below said top member;
 each metering block having a forward and a rear boss for successively engaging a single part from a row of parts on an accumulating conveyor; and
 wherein as said fluid cylinder is reciprocated, said metering blocks are pivoted from a loading position in which said accumulating conveyor can advance a part past said rear bosses into contact with said forward bosses to a discharge position in which said rear bosses contact said part, moving said part past said forward bosses to an advanced position, said rear bosses restraining advancement of the next part on said conveyor.

5. The meter assembly according to claim 4 wherein said pivot shafts are journaled in said top member and have square cross section portions which engage a rectangular slot in each of said pivot arms and metering blocks, said sections extending beyond a free side of said pivot arms and metering blocks to be engaged and retained by cap members containing rectangular slots, said cap members being fastened to said pivot arms and metering blocks to rigidly retain the square cross section portions of said pivot shafts.

* * * * *